2,919,305

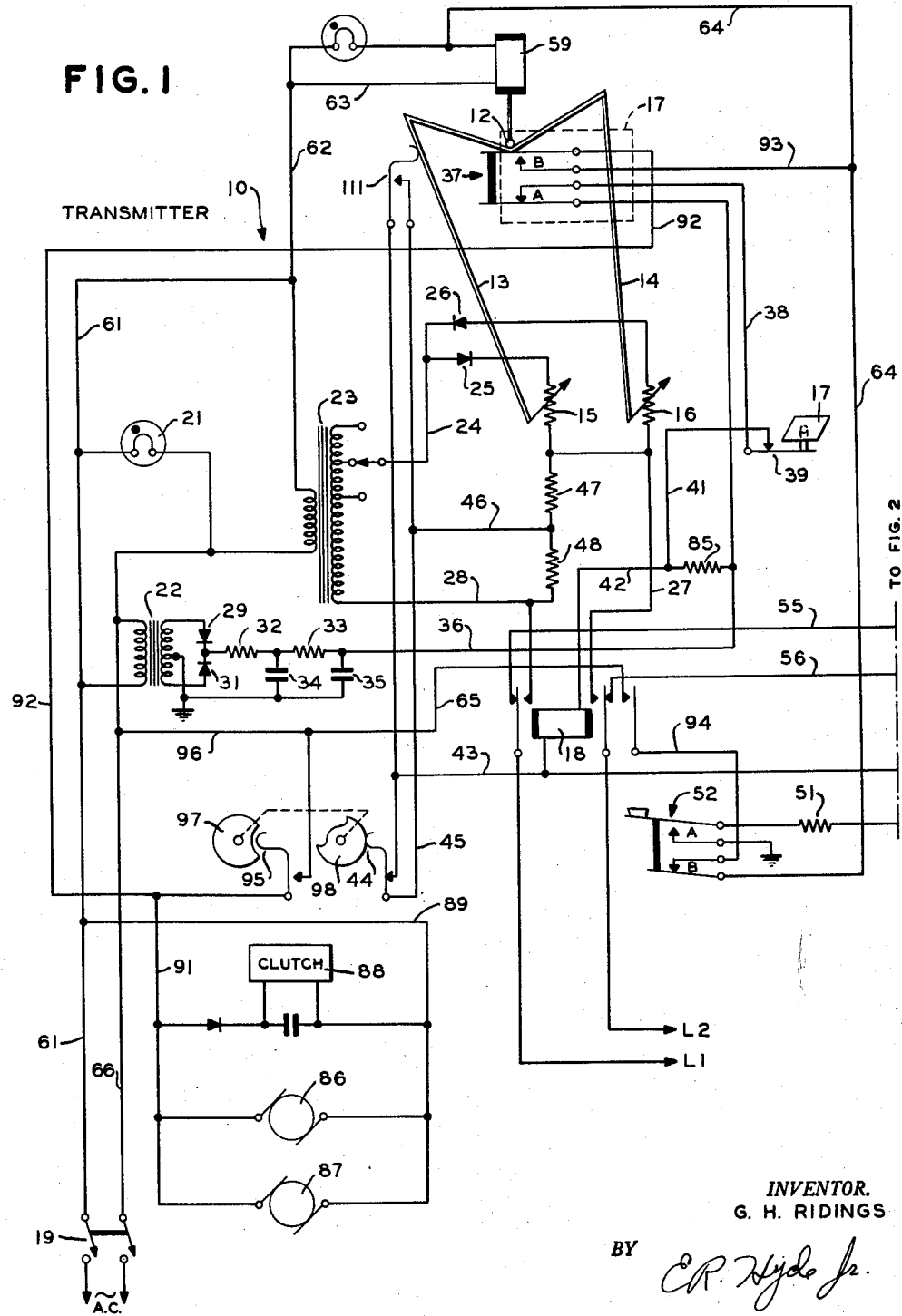

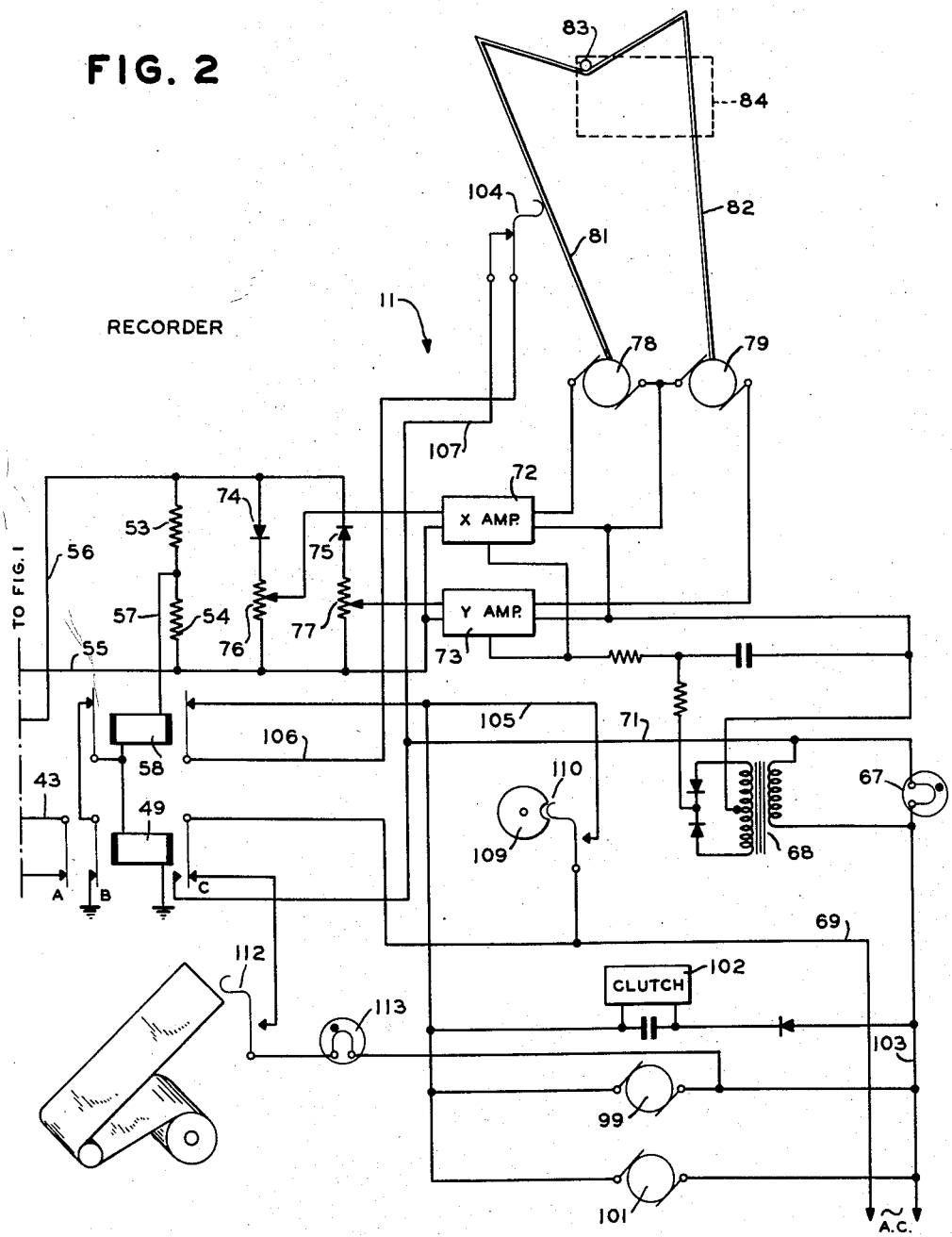

TELAUTOGRAPH SYSTEM

Garvice H. Ridings, Summit, N.J., assignor to The Western Union Telegraph Company, New York, N.Y., a corporation of New York Application January 26, 1956, Serial No. 561,530

5 Claims. (Cl. 178—19)

The present invention relates to improvements in telautograph systems for reproducing handwriting at a distance.

The customary telautograph system in use at the present time includes a transmitter unit operatively connected to a recorder located at a distant point. A transmitter pen or stylus is mechanically linked by pantograph arms to a pair of pen resistors, the values of which will vary in accordance with the position of the pen as it is manually moved over a platen to form characters. The pen resistors serve to control direct or alternating currents which are passed over a line pair to control a pair of recorder motors. The movements of the motors determine the position and movement of a recorder pen which is linked to the motors by pantograph arms. In addition to the pen movement currents it is also necessary to transmit control signals such as pen lift, paper feed, busy and calling. These signals are customarily transmitted over a separate line pair connecting the two stations. Disadvantages of these prior art systems including the multiplicity of connecting lines and the use of D.C. pen movement currents, or the use of ground return for intelligence signals. It is to these and other disadvantages that the present invention is directed.

Accordingly, a general object of the present invention is to provide an improved telautograph system.

Another object of the present invention is to provide an improved telautograph system employing varying amplitudes of alternate half waves for pen movement currents.

A further object of the present invention is to provide a telautograph system employing two conductors to transmit the pen movement currents and control signals.

These and other objects of the present invention are achieved by a novel circuit arrangement wherein voltage components representing pen movements are transmitted by amplitude variations of alternate half waves of a rectified alternating current. An A.C. source is passed through a pair of oppositely poled diodes which separate the A.C. into positive half waves which are passed to one pen resistor and negative half waves passed to the other pen resistor. The varying pen resistors' amplitude modulate their respective half wave currents which are then transmitted over a line pair to the distant recorder. A similar pair of oppositely poled diodes at the recorder separate the received modulated half waves which then control the recorder pen movement motors.

The invention will be more fully understood from the following description of a specific embodiment thereof taken with the drawings in which:

Figs. 1 and 2, taken together, are a schematic diagram of a telautograph station having a transmitter and recorder of the present invention.

Referring now to the drawings, there is shown a telautograph unit comprising a transmitter 10 and a recorder 11 located together at one station. This unit is connected by a line pair L1 and L2 to a similar transmitter and recorder at a distant station. The transmitter includes a pen 12 which is mechanically connected by pantograph arms 13 and 14 to a pair of variable pen resistors 15 and 16. As the pen is manually moved over the platen 17, the values of the resistance will change to reflect the pen movements in a known manner.

When the equipment is in the normal standby condition, the line wires L1 and L2 are connected to the recorder 11 through back contacts of transfer relay 18. The transmitter is operated by a source of voltage which may be a conventional 110 v. 60 cycle A.C. supply. When the switch 19 is closed, a power-on lamp 21 lights to indicate that the transmitter is energized, and the 60 cycle supply is applied to the primary windings of transformers 22 and 23.

One side of the secondary winding of transformer 23 is connected by wire 24 to a pair of diodes 25 and 26. The other sides of the diodes are connected to the pen resistors 15 and 16 respectively. The bottom terminals of the pen resistors are connected together and by wire 27 to a contact of transfer relay 18. When the transfer relay energizes, the pen resistors are therefore connected to line L2. Diodes 25 and 26 are oppositely poled so that alternate half waves of one polarity are passed to resistor 15 and the half waves of the opposite polarity are passed to resistor 16. Thus as the values of the pen resistance vary in following the movement of the transmitter pen, the magnitude of the respective half waves will be modulated and applied to the outgoing line. The return path for these half waves of current is to the other side of the secondary of transformer 23 over lead 28 and a contact of relay 18 which connects to line L1 when the relay is energized.

The secondary of transformer 22 is connected to rectifiers 29 and 31, the D.C. output of which is passed to a filter network comprising series resistor 32, 33 and capacitors 34, 35. The filtered direct current is applied to one side of transfer relay 18 over lead 36, the A contacts of paper feed switch 37, lead 38, platen switch 39 and leads 41 and 42. The other side of the transfer relay extends over lead 43, paper feed cam switch 44, leads 45 and 46 to the junction of line simplexing resistors 47 and 48. It is seen then that this D.C. current will be applied to the line upon the energization of the transfer relay.

Another path for the direct current may be traced from lead 43, through the normally closed A contacts of the local receiver relay 49, resistor 51, the A contacts of calling button 52 to ground. Thus depressing the calling button will apply ground to one side of the transfer relay which will thereupon energize to allow direct current to flow over the line pair to the remote receiver.

It is understood that the distant station is equipped with a transmitter and recorder of identical design as transmitter 10 and recorder 11. Therefore in considering the operation of the distant recorder, reference will be made to recorder 11. When relay 18 energizes by depressing calling button 52 the direct current from the simplexing resistors 47, 48 is passed over the line pair and applied to simplexing resistors 53 and 54 over wires 55 and 56 at the distant recorder. This direct current may then be traced over wire 57, pen lifter magnet 58 and receiver relay 49 to ground. The transmitter calling button 52 can then be released and transfer relay 18 will remain energized. With the relay 18 energized, a transmitter lockout solenoid 59 will be energized from one side of the A.C. supply, wires 61, 62, 63, the solenoid 59, wire 64, the B contacts of calling button 52, a single pair of contacts of relay 18, wire 65 and wire 66 to the other side of the A.C. supply. With the pen lock-out solenoid 59 energized, the transmitter pen 12 may be removed from its home position for the writing of the message to take place.

At the remote recorder, energization of relay 49 transfers its C contacts to light an in-use lamp 67 and apply a local A.C. signal to the primary of transformer 68 over wire 69, transfer contact C and wire 71. The secondary of transformer 68 connects to a pair of diodes which supply power to a pair of amplifiers 72 and 73. The incoming amplitude modulated half waves are passed by conductors 55, 56 to a pair of oppositely poled diodes 74 and 75. These diodes serve to separate the two series of modulated half waves representing the movements of the transmitter pen. The two pen movement currents are then applied to resistors 76 and 77 respectively to develop voltages thereacross which are amplified by amplifiers 72 and 73 respectively. The output of amplifier 72 is applied to a recorder pen arm motor 78 and the output of amplifier 73 is applied to motor 79. The pen arm motors 78 and 79 may be of any conventional construction to produce rotation in accordance with the amplitude of the applied signals. A pair of pantograph arms 81 and 82 are controlled by motors 78 and 79 respectively to determine the position of recorder pen 83 which moves over platen 84.

When the transmitter platen is depressed, platen switch 39 opens to interrupt the above traced D.C. path to the recorder pen lifter magnet 58 and recorder relay 49. However, a resistor 85 by-passes switch 39 to maintain the continuity of the D.C. simplex circuit. The resistor serves to reduce the current in the D.C. circuit so that the transfer relay 18 and recorder relay 49 remain energized while allowing the pen lifter magnet 58 to release whenever the transmitter platen 17 is depressed.

It is understood that the transmitter and recorder are each equipped with a supply roll of message paper which is passed over the respective platens and upon which the messages appear. At the transmitter the paper feed is controlled by a paper feed motor 86, takeup motor 87 and clutch 88 which are connected in parallel and to one side of the A.C. supply by wire 89. The other side of this parallel combination connects to the other side of the power line over a circuit traced over wires 91, 92, the normally open B contacts of paper feed switch 37, wires 93, 64, the B contacts of call button 52, wire 94, a pair of make contacts of transfer relay 18, wire 65 and wire 66. An alternative circuit goes from wire 91 through a cam controlled switch 95 and wire 96 to the power line 66. Cams 97 and 98, controlling switches 95 and 44 respectively, are mounted on a common shaft and suitably geared to the paper feed motor. The gearing ratio for the cams is chosen so that one revolution thereof corresponds to one frame of paper feed.

At the end of one frame of writing, the transmitting operator will insert the pen 12 in the home position and exert a downward pressure to actuate paper feed switch 37. The B contacts of switch 37 will thereupon close to complete the above traced circuit to energize paper feed motor 86, takeup motor 87 and clutch 88 to initiate the paper feed operation. The A contacts of switch 37 are opened to open the platen circuit thereby reducing the D.C. current to the recorder. This decrease in current releases the pen lifter magnet 58 in the same manner as when the transmitter platen switch 17 is opened during writing. Upon the release of magnet 58 with the recorder pen in its home position, the pen will dip into an inkwell suitably located to receive the pen. As the paper feed mechanism at the transmitter starts to operate, cams 97 and 98 will rotate. Cam 97 closes its associated switch 95 to provide a shunt path from wire 91 to line 65 so that if the downward pressure on pen 12 is removed after initiating paper feed, the paper feed motor 86, takeup motor 87 and clutch 88 will remain energized and the feed mechanism will continue to rotate until cam 97 returns to the normal position shown in the drawings. It is recalled that the cam is so geared that one frame of paper will be fed during one revolution of the cams.

The paper feed mechanism at the recorder is somewhat similar to the transmitter paper feed apparatus. A paper feed motor 99, takeup motor 101 and clutch 102 are connected in parallel and to one side of the local A.C. supply by line 103. It is recalled that when the transmitter operator initiates paper feed, the D.C. simplex current is decreased to release pen lifter magnet 58 while maintaining the recorder relay 49 energized. At this time both the transmitter and recording pens are in their home position so that the recorder pen arm switch 104 is closed. Thus a circuit may be traced from the local A.C. line 103, through the parallel combination of paper feed motor 99, takeup motor 101 and clutch 102, wire 105, contacts of pen lifter magnet 58, wire 106, closed pen arm switch 104, wire 107, make contacts of relay 49, wire 69 to the other side of the local A.C. line. The recorder paper feed mechanism thereupon feeds a new frame of paper over the platen. Cam 109 connects to the paper feed motor shaft and starts to rotate as the message paper is advanced. Cam switch 110 will close to shunt the contacts of relays 58 and 49 to maintain the paper feed mechanism energized though pen lifter magnet 58 may reenergize due to the transmitter operator removing the downward pressure on the transmitter pen 12. The speed of rotation of cam 109 is properly geared so that one frame of message paper will be fed during one revolution thereof.

At the end of a message, or series of message frames, when it is desired to release the line, the transmitting operator initiates the paper feed and then leaves the pen 12 in the home position thereby opening the transmitter pen arm switch 111. This opens one shunt path of the simplex circuit, and as cam 98 rotates it will open the other path to deenergize the transfer relay 18. Of course, the original depression of the paper feed switch 37 at the transmitter caused the recorder pen lifter magnet 58 to release and operate the recorder paper feed mechanism so that when the transfer relay 18 deenergizes to release the recorder relay 49, the recorder will be returned to the standby or off condition. The deenergization of relay 18 also removes the A.C. from the lockout solenoid 59 thereby locking the transmitter pen in the home position and extinguishes the write lamp. At the recorder, a paper actuated switch 112 will close, and since relay 49 is released a message received lamp 113 will be energized to indicate to an attendant that the transmission of a message is concluded.

The specific embodiment of the invention above described makes use of a line pair or loop transmission line for transmitting the rectified half waves of the pen movement currents and a grounded simplex circuit. An alternative arrangement would be a single wire for the pen movement currents and a separate wire for the D.C. control signals, both using a ground return. It is understood that this and other modifications and substitutions of equivalents may be made without departing from the spirit and scope of the invention as defined in the appended claims.

What is claimed is:

1. A telautograph communication system comprising a transmitting station having transmitter pantograph means, an electric circuit, said circuit including variable resistor means connected to said pantograph means whereby movements thereof vary the effective values of said resistor means, a source of alternating current having alternate positive and negative half waves, a pair of oppositely poled rectifying elements connected to said alternating current source and to said resistor means whereby a first series of alternate half waves of one polarity and a second series of alternate half waves of the opposite polarity are amplitude modulated in accordance with the movement of the pantograph means, a two conductor transmission line, means connecting said resistor means to said line, a telautograph receiving station located at a distance from said transmitting station and connected to the transmission line, said receiving station including recording pantograph means, a pair of motor means connected to said recording pantograph means, a second pair of oppositely poled rectifying elements connected to said transmission line, circuit means connecting each of said pair of rectifying means to a respective one of said pair of motor means whereby said first series of alternate half waves and the said second series of alternate half waves control said motor means to move the recording pantograph means in accordance with the movements of the transmitter pantograph means, said two conductor transmission line being the sole electrical connection between the transmitting and receiving stations.

2. A telautograph communication system comprising a transmitting station having transmitter pantograph means including a first arm and a second arm, a transmitter pen secured to said pantograph means, an electric circuit, said circuit including a first and second variable resistor connected to said first and second arm respectively whereby movements of said pen vary the effective values of said resistors, a source of alternating current having alternate positive and negative half waves, a pair of oppositely poled rectifying elements connected to said alternating current source and to said first and second resistors respectively whereby a first series of alternate half waves of one polarity pass to the first resistor and a second series of alternate half waves of the opposite polarity pass to the second resistor, said first and second series of half waves being amplitude modulated in accordance with the movement of the transmitter pen, a two conductor transmission line, means connecting said first and second resistors to said line, a telautograph receiving station located at a distance from said transmitting station and connected to the transmission line, said receiving station including recorder pantograph means having a first arm and a second arm, a recorder pen secured to said recorder pantograph means, first motor means and second motor means connected to said first and second arms respectively, a second pair of oppositely poled rectifying means connected to said transmission line, circuit means connecting one of said pair of rectifying means to the first motor means and the other of said pair of rectifying means to the second motor means whereby said first series of alternate half waves control the first motor means and the said second series of alternate half waves control the second motor means to move the recorder pen in accordance with the movements of the transmitter pen, said two conductor transmission line being the sole electrical connection between the transmitting and receiving stations.

3. A telautograph communication system comprising a first station and a second station, a pair of line conductors connecting said first and second stations, each of said stations having a transmitter unit and a recorder unit, said transmitter unit including pantograph means, a source of A.C. signals, means to separate said signals into two series of alternate half waves, means to modulate the two series of half waves by said pantograph means, transfer means to selectively connect the transmitter and recorder to the line, a source of direct current, circuit means to connect said direct current to said transfer means to connect said transmitter to the line, means to selectively connect said direct current to the line, said recorder unit comprising pantograph means, motor means connected to the recorder pantograph means, means to separately apply the two series of alternate half waves to the motor means to control the recorder pantograph means in accordance with the movements of the transmitter pantograph means, relay means, said relay means being connected to the line and responsive to direct current signals from the connected distant transmitter said pair of line conductors being the sole means of connection between the stations.

4. A telautograph communication system comprising a transmitter and a recorder adapted to be interconnected solely by a two conductor transmission line, said transmitter including pantograph means, a source of alternating current, means to separate said alternating current into a positive series of half waves and a negative series of half waves, means controlled by said pantograph means to separately modulate each of said positive and negative series of half waves, means to recombine said modulated positive and negative series of half waves to form an alternating current of alternate separately modulated pulses, means to apply said modulated alternating current to said transmission line, said recorder comprising means to separate said modulated alternating current into a first series of modulated half waves and a second series of modulated half waves, pantograph actuating means, means to apply said first and second series of half waves separately to said actuating means, and pantograph means connected to said actuating means, whereby the transmitter and recorder may be interconnected solely by said line and without a ground return therebetween.

5. A telautograph communication system comprising transmitting apparatus, recording apparatus, a two conductor transmission line interconnecting said transmitting and recording apparatus, said two conductor transmission line being the sole means of electrical connection between the transmitting and recording apparatus, said transmitting apparatus comprising first pantograph means, an electric circuit including a pair of variable resistors connected to said pantograph means whereby movements thereof vary the effective values of said resistors, a source of alternating current having positive and negative half waves, a first pair of oppositely poled rectifying elements connected to said alternating current source and to said pair of variable resistors whereby a first series of alternate half waves of one polarity pass to one of the elements and a second series of alternate half waves of the opposite polarity pass to the other of said pair of elements, said first and second series of half waves being amplitude modulated in accordance with the movement of the first pantograph means, means connecting said pair of resistors to said line, said recording apparatus comprising second pantograph means, a pair of motors connected to said second pantograph means, a second pair of oppositely poled rectifying elements, electric circuit means connecting said second pair of rectifying elements to said transmission line whereby said first and second series of modulated half waves are separated and means connecting each one of said second pair of rectifying elements to a respective one of said pair of motors.

References Cited in the file of this patent

UNITED STATES PATENTS

| | | |
|---|---|---|
| 1,544,871 | Tiffany | July 7, 1925 |
| 2,001,837 | Craig | May 21, 1935 |
| 2,054,496 | Craig | Sept. 15, 1936 |
| 2,098,605 | Wohlgemuth | Nov. 9, 1937 |
| 2,141,388 | Harrison et al. | Dec. 27, 1938 |
| 2,269,599 | Moodey | Jan. 13, 1942 |